United States Patent
Tan et al.

(10) Patent No.: US 11,208,937 B1
(45) Date of Patent: Dec. 28, 2021

(54) METHOD FOR DIAGNOSING DIESEL OXIDATION CATALYST FAULT

(71) Applicant: TONGJI UNIVERSITY, Shanghai (CN)

(72) Inventors: Piqiang Tan, Shanghai (CN); Chaojie Yao, Shanghai (CN); Deyuan Wang, Shanghai (CN); Zhiyuan Hu, Shanghai (CN); Diming Lou, Shanghai (CN); Yunhua Zhang, Shanghai (CN); Liang Fang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/355,215

(22) Filed: Jun. 23, 2021

(30) Foreign Application Priority Data

Jul. 21, 2020 (CN) .......................... 202010706538.X

(51) Int. Cl.
*F01N 3/00* (2006.01)
*F01N 11/00* (2006.01)
(Continued)

(52) U.S. Cl.
CPC ............ *F01N 11/00* (2013.01); *B01D 53/944* (2013.01); *F01N 3/103* (2013.01); *F01N 3/2006* (2013.01); *F01N 2550/02* (2013.01)

(58) Field of Classification Search
CPC ........ F01N 11/00; F01N 3/2006; F01N 3/103; F01N 2550/02; B01D 53/944
See application file for complete search history.

(56) References Cited

U.S. PATENT DOCUMENTS

| | | |
|---|---|---|
| 7,067,319 B2 | 6/2006 | Wills et al. |
| 8,413,422 B2 | 4/2013 | Kasahara |

(Continued)

FOREIGN PATENT DOCUMENTS

| | | |
|---|---|---|
| CN | 110067618 A | 3/2019 |
| CN | 110595092 A | 12/2019 |

(Continued)

*Primary Examiner* — Matthew T Largi
(74) *Attorney, Agent, or Firm* — True Shepherd LLC; Andrew C. Cheng

(57) ABSTRACT

A method for diagnosing a diesel oxidation catalyst fault includes: obtaining an standard molar enthalpy of formation-revolution speed-load table; obtaining a revolution speed, a load, a temperature difference of front and rear exhaust pipes, and a casing temperature, obtaining an standard molar enthalpy of formation corresponding to the revolution speed and the load from the standard molar enthalpy of formation-revolution speed-load table, and calculating an actual formation enthalpy corresponding to the temperature difference of front and rear exhaust pipes and the casing temperature from the temperature difference of front and rear exhaust pipes and the casing temperature; calculating a standard reaction enthalpy from the standard molar enthalpy of formation and standard conversion efficiency; and diagnosing a diesel oxidation catalyst fault by comparing the actual formation enthalpy with the standard reaction enthalpy. The method is capable of realizing online fault diagnosis on a diesel oxidation catalyst without the disassembly of the diesel oxidation catalyst.

10 Claims, 2 Drawing Sheets

(51) Int. Cl.
  *F01N 3/10* (2006.01)
  *B01D 53/94* (2006.01)
  *F01N 3/20* (2006.01)

(56) References Cited

U.S. PATENT DOCUMENTS

| | | | |
|---|---|---|---|
| 10,753,251 B2* | 8/2020 | Barciela | F01N 13/009 |
| 10,808,594 B2* | 10/2020 | Dimoski | F01N 11/00 |
| 10,934,922 B2 | 3/2021 | Khaled et al. | |
| 2013/0139488 A1* | 6/2013 | Miao | F01N 3/208 |
| | | | 60/274 |
| 2014/0202139 A1* | 7/2014 | Qi | F01N 3/035 |
| | | | 60/295 |
| 2020/0347791 A1* | 11/2020 | Ghazi | F02B 37/24 |

FOREIGN PATENT DOCUMENTS

| | | |
|---|---|---|
| CN | 110630365 A | 12/2019 |
| CN | 111306722 A | 6/2020 |
| DE | 102009060288 A1 | 6/2011 |
| DE | 102015223686 A1 | 6/2017 |
| FR | 3078996 A1 | 9/2019 |
| WO | 2019229027 A1 | 12/2019 |

* cited by examiner

METHOD FOR DIAGNOSING DIESEL OXIDATION CATALYST FAULT

CROSS REFERENCE TO RELATED APPLICATION(S)

This patent application claims the benefit and priority of Chinese Patent Application No. 202010706538.X filed on Jul. 21, 2020, the disclosure of which is incorporated by reference herein in its entirety as part of the present application.

TECHNICAL FIELD

The present disclosure relates to the field of power machinery and engineering, and in particular, to a method for diagnosing a diesel oxidation catalyst (DOC) fault.

BACKGROUND

Diesel engines are widely used in the fields of transportation, agricultural machinery and engineering machinery due to excellent power performance and fuel efficiency. However, the exhaust gas emitted by diesel engines contains a lot of pollutants that are not completely combusted, such as carbon monoxide (CO), hydrocarbons (HCs), and carbonaceous particles (C), causing severe pollution to the atmospheric environment and posing a serious threat to the health of residents. A diesel oxidation catalyst (DOC) is capable of oxidizing CO, HCs and part of carbonaceous particles into carbon dioxide and water that are harmless to humans, and thus serves as a necessary technical means for diesel engines to meet current emission regulations.

The DOC can effectively reduce carbon monoxide and hydrocarbons in diesel engine exhaust gas. In modern diesel engines, porous honeycomb ceramics are usually used as a DOC carrier. There are many parallel channels in the carrier, so that the exhaust gas entering from the inlet is divided into a plurality of parts to pass through the channels. During this process, the exhaust gas comes into sufficient contact with the walls of the channels, so that CO and HCs undergo complete oxydoreduction reaction with oxygen in the presence of a noble metal catalyst applied on the walls and thus are converted into carbon dioxide and water. In this way, the exhaust gas is purified.

During the working process of the DOC, desorption and failure of the catalyst may occur due to the heat released by the oxydoreduction reaction, the scouring of high-speed exhaust gas and the adhesion of emissions. Consequently, the expected purification effect cannot be achieved. Therefore, it is important to evaluate the real-time performance of the DOC.

SUMMARY

An objective of the present disclosure is to provide a method for diagnosing a diesel oxidation catalyst fault in order to overcome the defects of the prior art as described above.

The objective of the present disclosure can be achieved by the following technical solution:

A method for diagnosing a diesel oxidation catalyst fault includes the following steps:

step S1: obtaining an standard molar enthalpy of formation-revolution speed-load table;

step S2: obtaining a revolution speed, a load, a temperature difference of front and rear exhaust pipes, and a casing temperature, obtaining an standard molar enthalpy of formation corresponding to the revolution speed and the load from the standard molar enthalpy of formation-revolution speed-load table, and calculating an actual formation enthalpy corresponding to the temperature difference of front and rear exhaust pipes and the casing temperature from the temperature difference of front and rear exhaust pipes and the casing temperature;

step S3: calculating a standard reaction enthalpy from the standard molar enthalpy of formation and standard conversion efficiency; and step S4: diagnosing a diesel oxidation catalyst fault by comparing the actual formation enthalpy with the standard reaction enthalpy.

The standard molar enthalpy of formation-revolution speed-load table may be obtained through experiments conducted on a diesel oxidation catalyst in good condition.

The temperature difference of front and rear exhaust pipes and the casing temperature may be measured by using a temperature sensor or a thermodetector, and the revolution speed and the load may be obtained by using an electronic control unit (ECU).

The actual formation enthalpy $\Delta H_{online}$ may be calculated from the temperature difference $\Delta T$ of front and rear exhaust pipes and the casing temperature $T_1$ according to the following formula:

$$\Delta H_{online} = C_{exhaustgas} \Delta T + \zeta_{mental\text{-}air}(T_1 - T_{air})$$

where $C_{exhaustgas}$ is heat capacity of exhaust gas; $\zeta_{mental\text{-}air}$ is a coefficient of heat exchange between the wall of the diesel oxidation catalyst and air; and $T_{air}$ is an air temperature in the vicinity of the wall of the diesel oxidation catalyst.

The standard conversion efficiency may be calculated from the temperature difference of front and rear exhaust pipes and the casing temperature.

The standard conversion efficiency may be obtained by querying carrier temperature-standard conversion efficiency, where the carrier temperature $T_{carrier}$ is calculated by the following formula:

$$T_{carrier} = (\Delta T + 0.5 T_1)/2.5$$

where $\Delta T$ is the temperature difference of front and rear exhaust pipes, and $T_1$ is the casing temperature.

The standard reaction enthalpy $\Delta H_{standard}$ may be calculated by the following formula:

$$\Delta H_{standard} = Conv_{standard} \times \Delta H_{ideal}$$

where $Conv_{standard}$ is the standard conversion efficiency, and $\Delta H_{ideal}$ is the standard molar enthalpy of formation.

After the actual formation enthalpy and the standard reaction enthalpy are obtained, an instantaneous performance score may be calculated. Instantaneous performance scores under different working conditions may be weighted to obtain an average performance score. The overall performance of the diesel oxidation catalyst may be obtained from the average performance score.

The instantaneous performance score $F_{DOCT}$ may be calculated by the following formula:

$$F_{DOCT} = \Delta H_{online}/\Delta H_{standard}$$

where $\Delta H_{online}$ is the actual formation enthalpy, and $\Delta H_{standard}$ is the standard reaction enthalpy.

Instantaneous performance scores near a particular working condition point may be weighted to obtain a weighted instantaneous performance score-revolution speed-torque table. A diesel oxidation catalyst fault may be predicted based on the weighted instantaneous performance score-revolution speed-torque table.

Compared with the prior art, the present disclosure has the following advantages:

(1) During traveling or parking of a vehicle, the engine operates under a particular working condition. The temperature difference of front and rear exhaust pipes and the casing temperature are measured, and the actual formation enthalpy is compared with the standard reaction enthalpy under this working condition corresponding to the standard molar enthalpy of formation obtained through experiments conducted on a DOC in good condition. Thus, the evaluation of the performance of the DOC is achieved. Besides, online fault diagnosis can be performed on the DOC without the disassembly of the DOC as long as the engine operates under a particular working condition.

(2) The revolution speed and the load can be obtained by the ECU without addition of extra devices. The temperature difference of front and rear exhaust pipes and the casing temperature can be measured by using the temperature sensor or the thermodetector, which is simple and easy to operate with low cost.

(3) The overall performance of the DOC may be obtained based on the average performance score, and a diesel oxidation catalyst fault may be predicted based on the weighted instantaneous performance score-revolution speed-torque table.

DETAILED DESCRIPTION

Figure 1:
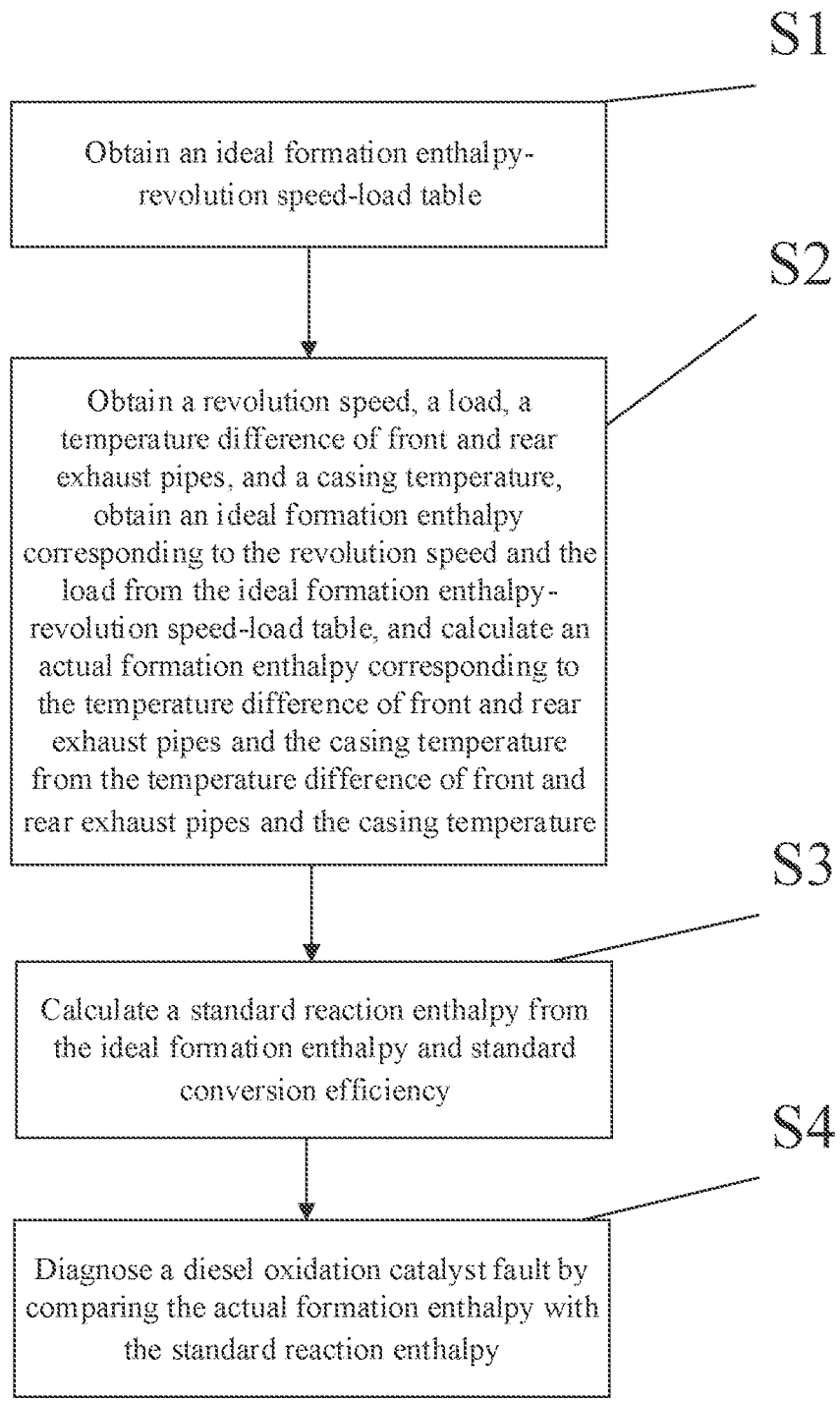
FIG. 1 is a flowchart according to an embodiment of present disclosure.
Figure 2:
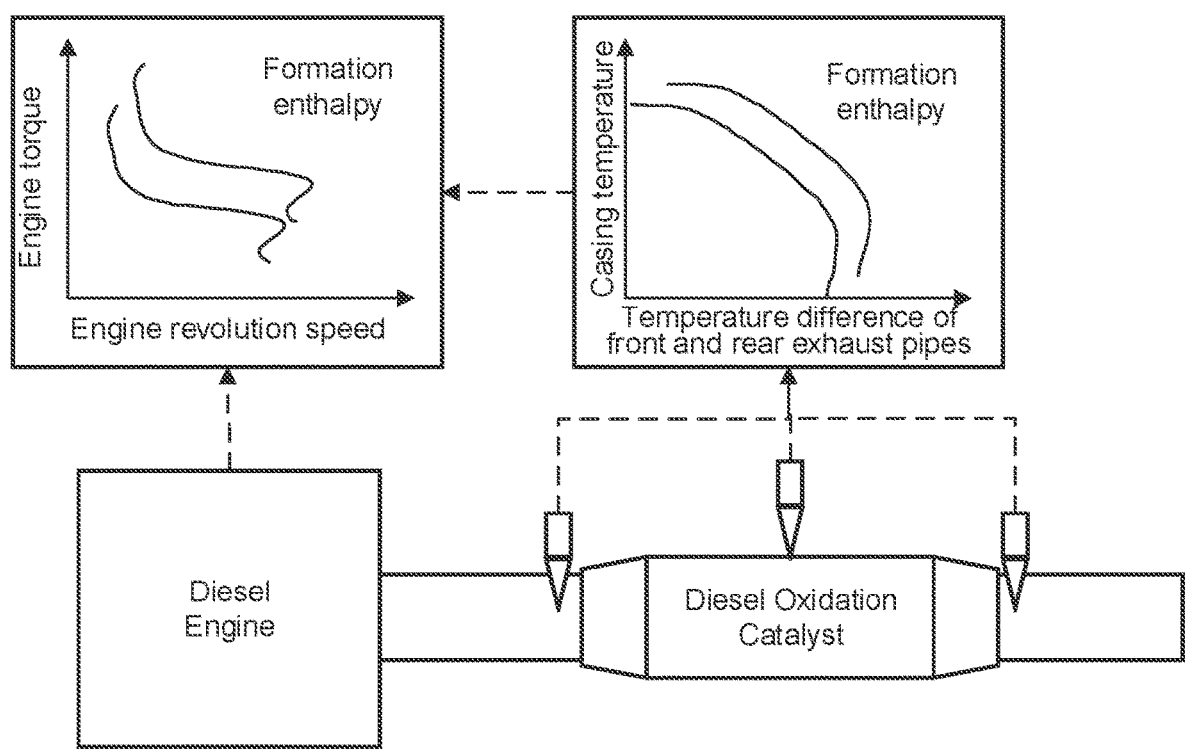
FIG. 2 is a schematic diagram according to an embodiment of present disclosure.

The present disclosure will be described in detail below in conjunction with the accompanying drawings and a specific embodiment. The embodiment is carried out on the premise of the technical solution of the present disclosure. Details of the embodiment and a specific operation process are given, but the protection scope of the present disclosure is not limited to the following embodiment.

Embodiment

This embodiment provides a method for diagnosing a diesel oxidation catalyst fault, including the following steps:

step S1: obtaining an standard molar enthalpy of formation-revolution speed-load table;

step S2: obtaining a revolution speed, a load, a temperature difference of front and rear exhaust pipes, and a casing temperature, obtaining an standard molar enthalpy of formation corresponding to the revolution speed and the load from the standard molar enthalpy of formation-revolution speed-load table, and calculating an actual formation enthalpy corresponding to the temperature difference of front and rear exhaust pipes and the casing temperature from the temperature difference of front and rear exhaust pipes and the casing temperature;

step S3: calculating a standard reaction enthalpy from the standard molar enthalpy of formation and standard conversion efficiency; and step S4: diagnosing a diesel oxidation catalyst fault by comparing the actual formation enthalpy with the standard reaction enthalpy.

Specifically, the standard molar enthalpy of formation-revolution speed-load table is laboratory measurements obtained through experiments conducted on a diesel oxidation catalyst in good condition. The revolution speed and the load are obtained by using an electronic control unit (ECU).

The temperature difference of front and rear exhaust pipes and the casing temperature is measured by using a temperature sensor or a thermodetector.

The actual formation enthalpy $\Delta H_{online}$ is calculated from the temperature difference $\Delta T$ of front and rear exhaust pipes and the casing temperature $T_1$ according to the following formula:

$$\Delta H_{online} = C_{exhaustgas}\Delta T + \zeta_{mental\text{-}air}(T_1 - T_{air})$$

where $C_{exhaustgas}$ is heat capacity of exhaust gas, which may be regarded as a constant value within temperature and composition variation ranges in a diesel engine after-treatment system; $\zeta_{mental\text{-}air}$ is a coefficient of heat exchange between the wall of the diesel oxidation catalyst and air, which is a constant value; and $T_{air}$ is an air temperature in the vicinity of the wall of the diesel oxidation catalyst, which does not change significantly relative to $T_1$ during the operation of the engine and can be regarded as a constant value within an error range.

In this embodiment, the standard conversion efficiency $T_{carrier}$ is calculated from the temperature difference of front and rear exhaust pipes and the casing temperature according to the following formula:

The standard conversion efficiency is obtained by querying carrier temperature-standard conversion efficiency that is measured through experiments in a laboratory. The carrier temperature can be calculated by several approaches, such as by using a DOC heat transfer model or by averaging. In this embodiment, the carrier temperature $T_{carrier}$ is calculated from the temperature difference of front and rear exhaust pipes and the casing temperature according to the following formula:

$$T_{carrier} = (\Delta T + 0.5 T_1)/2.5.$$

The standard reaction enthalpy $\Delta H_{standard}$ is calculated by the following formula:

$$\Delta H_{standard} = \text{Conv}_{standard} \times \Delta H_{ideal}$$

where $\text{Conv}_{standard}$ is the standard conversion efficiency, and $\Delta H_{ideal}$ is the standard molar enthalpy of formation.

After the actual formation enthalpy and the standard reaction enthalpy are obtained, an instantaneous performance score is calculated. Instantaneous performance scores under different working conditions are weighted, i.e., averaged in this embodiment, to obtain an average performance score. The overall performance of the diesel oxidation catalyst is obtained from the average performance score. The instantaneous performance score $F_{DOCT}$ is calculated by the following formula:

$$F_{DOCT} = \Delta H_{online}/\Delta H_{standard}$$

where $\Delta H_{online}$ is the actual formation enthalpy, and $\Delta H_{standard}$ is the standard reaction enthalpy.

Instantaneous performance scores near a particular working condition point are weighted to obtain a weighted instantaneous performance score-revolution speed-torque table. A diesel oxidation catalyst fault is predicted based on the weighted instantaneous performance score-revolution speed-torque table.

For example, after 1000 s, the average performance score is $$\overline{F_{DOC}} = \sum_{i=0}^{1000} F_{DOCT-i}/1000,$$

where $F_{DOCT-i}$ is the instantaneous performance score under working condition i. For a particular working condition point p, a region thereof is: $n_i \in [1000,1050]$, $T_i \in [200,205]$, where $n_i$ is an engine revolution speed under working condition i, and $T_i$ is an engine torque under working condition i; and the weighted instantaneous performance score is $\overline{F_{DOC-p}} = \Sigma F_{DOCT-i}/N(i)$, ($n_i \in [1000,1050]$, $T_i \in [200, 205]$), where N(i) is a total number of samples within the range of the working condition point. The $\overline{F_{DOC-p}}$ near each working condition point is calculated to obtain the instantaneous performance score-revolution speed-torque table. If the average performance score $\overline{F_{DOC}}$ is less than 0.8, there may be a diesel oxidation catalyst fault.

What is claimed is:

1. A method for diagnosing a diesel oxidation catalyst fault, comprising the following steps:
   step S1: obtaining a standard molar enthalpy of formation-revolution speed-load table;
   step S2: obtaining a revolution speed, a load, a temperature difference of front and rear exhaust pipes, and a casing temperature, obtaining a standard molar enthalpy of formation corresponding to the revolution speed and the load from the standard molar enthalpy of formation-revolution speed-load table, and calculating an actual formation enthalpy corresponding to the temperature difference of front and rear exhaust pipes and the casing temperature from the temperature difference of front and rear exhaust pipes and the casing temperature;
   step S3: calculating a standard reaction enthalpy from the standard molar enthalpy of formation and a standard conversion efficiency; and
   step S4: diagnosing a diesel oxidation catalyst fault by comparing the actual formation enthalpy with the standard reaction enthalpy.

2. The method according to claim 1, wherein the standard molar enthalpy of formation-revolution speed-load table is obtained through experiments conducted on a diesel oxidation catalyst in good condition.

3. The method according to claim 1, wherein the temperature difference of front and rear exhaust pipes and the casing temperature are measured by using a temperature sensor or a thermodetector, and the revolution speed and the load are obtained by using an electronic control unit (ECU).

4. The method according to claim 1, wherein the actual formation enthalpy $\Delta H_{online}$ is calculated from the temperature difference $\Delta T$ of front and rear exhaust pipes and the casing temperature $T_1$ according to the following formula:

$$\Delta H_{online} = C_{exhaustgas}\Delta T + \zeta_{mental-air}(T_1 - T_{air})$$

wherein $C_{exhaustgas}$ is a heat capacity of exhaust gas; $\zeta_{mental-air}$ is a coefficient of heat exchange between a wall of a diesel oxidation catalyst and air; and $T_{air}$ is an air temperature in the vicinity of the wall of the diesel oxidation catalyst.

5. The method according to claim 1, wherein the standard conversion efficiency is calculated from the temperature difference of front and rear exhaust pipes and the casing temperature.

6. The method according to claim 5, wherein the standard conversion efficiency is obtained by querying a carrier temperature-standard conversion efficiency, wherein the carrier temperature $T_{carrier}$ is calculated by the following formula:

$$T_{carrier} = (\Delta T + 0.5 T_1)/2.5$$

wherein $\Delta T$ is the temperature difference of front and rear exhaust pipes, and $T_1$ is the casing temperature.

7. The method according to claim 1, wherein the standard reaction enthalpy standard is calculated by the following formula:

$$\Delta H_{standard} = \text{Conv}_{standard} \times \Delta H_{ideal}$$

wherein $\text{Conv}_{standard}$ is the standard conversion efficiency, and $\Delta H_{ideal}$ is the standard molar enthalpy of formation.

8. The method according to claim 1, wherein after the actual formation enthalpy and the standard reaction enthalpy are obtained, an instantaneous performance score is calculated; instantaneous performance scores under different working conditions are calculated and weighted to obtain an average performance score; and an overall performance of a diesel oxidation catalyst is obtained from the average performance score.

9. The method according to claim 8, wherein the instantaneous performance score $F_{DOCT}$ is calculated by the following formula:

$$F_{DOCT} = \Delta H_{online}/\Delta H_{standard}$$

wherein $\Delta H_{online}$ is the actual formation enthalpy, and $\Delta H_{standard}$ is the standard reaction enthalpy.

10. The method according to claim 8, wherein instantaneous performance scores near a particular working condition point are weighted to obtain a weighted instantaneous performance score-revolution speed-torque table; and the diesel oxidation catalyst fault is diagnosed based on the weighted instantaneous performance score-revolution speed-torque table.

* * * * *